Figure 1:
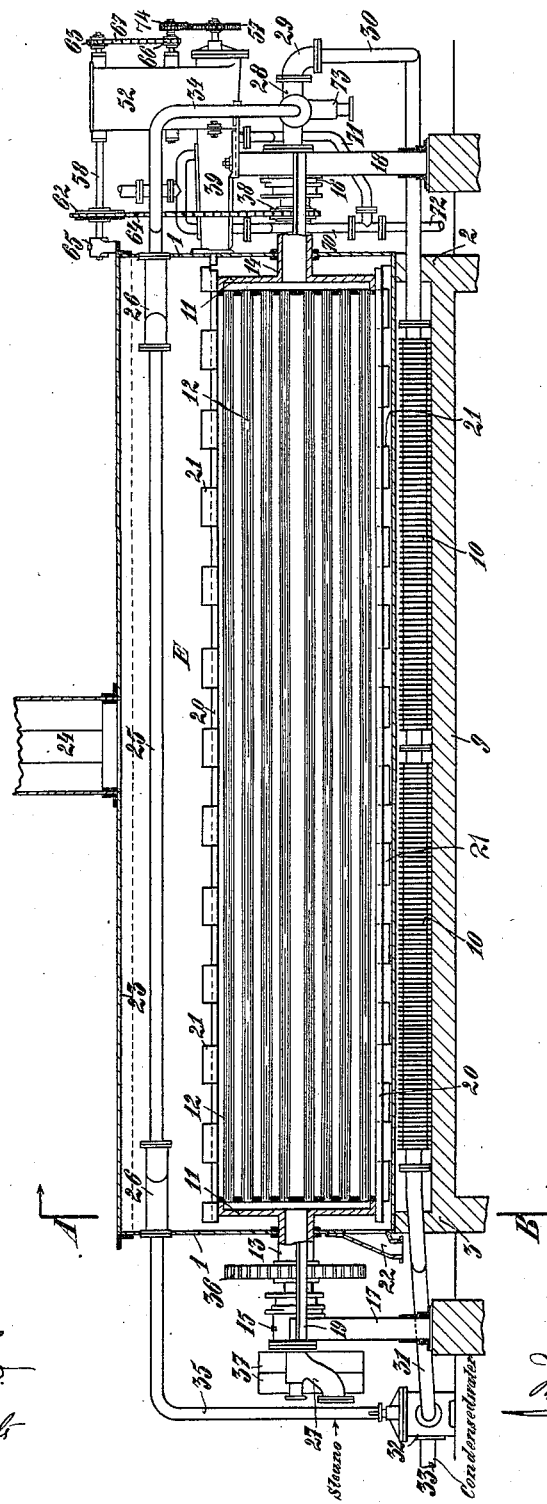

W. PONNDORF.
MALT OR GRAPE HUSKS DRYING APPARATUS.
APPLICATION FILED NOV. 9, 1911.
1,052,845.
Patented Feb. 11, 1913.
2 SHEETS—SHEET 2.
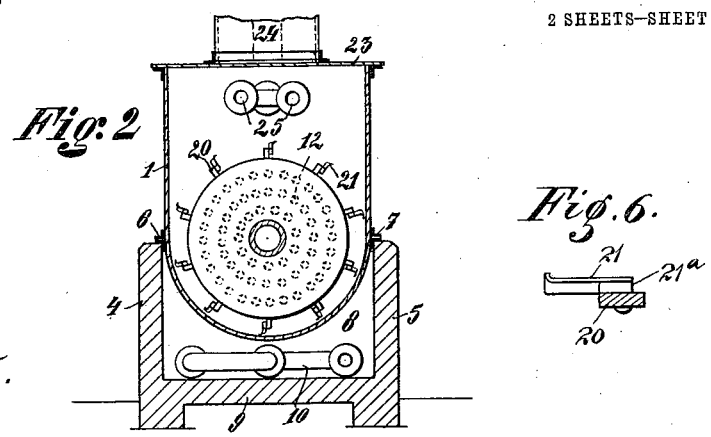
Fig. 2.
Fig. 6.
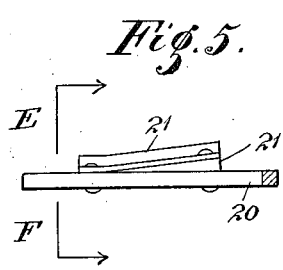
Fig. 5.
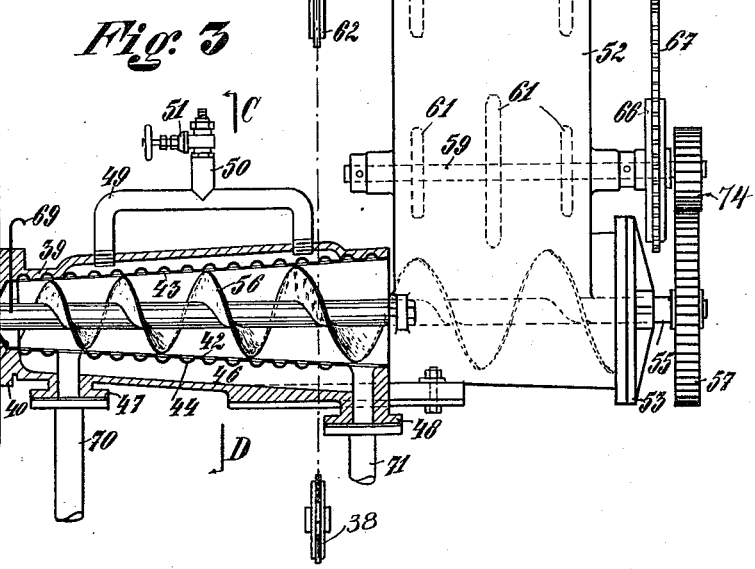
Fig. 3.
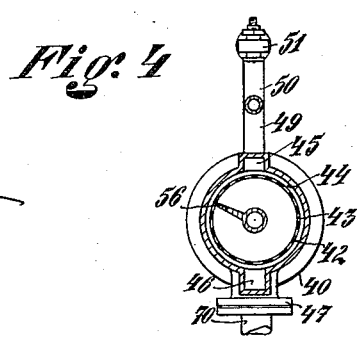
Fig. 4.
Witnesses:
Inventor:

UNITED STATES PATENT OFFICE.

WILHELM PONNDORF, OF CASSEL, GERMANY.

MALT OR GRAPE-HUSKS DRYING APPARATUS.

1,052,845.  Specification of Letters Patent.  Patented Feb. 11, 1913.

Application filed November 9, 1911. Serial No. 659,341.

*To all whom it may concern:*

Be it known that I, WILHELM PONNDORF, a citizen of the Empire of Germany, residing at Cassel, in the Empire of Germany, have invented a new and useful Malt or Grape-Husks Drying Apparatus, of which the following is a specification.

My invention relates to improvements in apparatus comprising a vessel and a rotary multitubular drum therein for drying spent malt or husks of grapes; and, the objects of my improvement are, first, to provide on the outside of the vessel a device for preliminarily drying the husks by squeezing out of them a part of the water or liquid; second, to provide a heating device beneath the vessel for increasing the drying effect, and, third, to provide means for heating the steam developed in the vessel from the husks, so as to prevnt it from condensing and wetting the rotary drum and to accelerate its discharge. I attain these objects by the mechanism illustrated in the accompanying drawings, in which—

Figure 1 is an elevation of the entire apparatus, the vessel with the rotary drum being shown in section. Fig. 2 is a vertical cross section through the same on the line A—B in Fig. 1, seen in the direction of the arrows, Fig. 3 is partly an elevation and partly a vertical longitudinal section on an enlarged scale of the device for preliminarily drying the husks, and Fig. 4 is a vertical cross section through the line C—D in Fig. 3, seen in the direction of the arrows, and Figs. 5 and 6 show a detail of the drum, Fig. 5 being a view from right to left in Fig. 6 and Fig. 6 a cross section through the line E—F in Fig. 5.

Similar characters of reference refer to similar parts throughout the several views.

1 in Figs. 1 and 2 denotes a prismatic vessel having a semicylindric bottom and being supported at the ends by two brick-walls 2 and 3, which are suitably recessed, and on the sides by two brick-walls 4 and 5, against which two ledges 6 and 7 on the vessel are made to bear. In the chamber 8 formed by a brick-pavement 9, the four brick-walls 2, 3, 4, 5 and the bottom of the vessel 1 a serpentine line of heating ribbed tubes 10, 10 is disposed. Within the vessel 1 a rotary heating drum E is disposed, which consists of two hollow end disks 11, 11 and a number of horizontal tubes 12, 12 secured between them. The hollow trunnions 13, 14 made in one with the two end disks 11, 11 pass through corresponding holes in the end walls of the vessel 1 and are mounted to turn in suitable stuffing-boxes 15 and 16, which form parts of suitable standards 17 and 18 respectively. The standards 17 and 18 may be connected with the end walls of the vessel 1 by means of studs 19, 19 as shown. On the periphery of the two end disks 11, 11 a series of bars 20, 20 are fastened, which connect together these two disks and carry each a number of ladles 21, 21 set at a suitable distance from one another. Preferably the ladles 21, 21 are inclined to the axis of the drum by inserting tapering pieces 21ª, 21ª between the ladles 21, 21 and the bars 20, 20, as is shown at Figs. 5 and 6, or in any other known manner. Further the ladles 21, 21 on any bar 20 are made to alternate with the ladles on the two neighboring bars. It will be now understood, that as the outer edges of the ladles 21, 21 remain in close proximity of the semicylindric bottom of the vessel 1 during the rotation of the drum E, the ladles will be able not only to take along with them the husks and to throw them over the tubes 12, 12, but also to gradually move the husks from the right end to the left end of the vessel 1 in Fig. 1. Where so preferred, the outer edges of the ladles 21, 21 may be slightly bent, as is shown in Fig. 6. A suitable outlet 22 is provided on the left end wall of the vessel 1 near its bottom for permitting the dried husks to escape.

The vessel 1 is closed by means of a cover 23, on which a square chimney 24 of wood is shown to be disposed in the middle. In the chamber above the rotary heating drum E two parallel horizontal tubes 25, 25 are disposed, which at their ends are connected together by means of forked tubes 26, 26, that are fastened with their flanges to the end walls of the vessel 1. Steam can be supplied to the apparatus through a suitable bend 27, the steam passing from thence through the left stuffing-box 15, the left trunnion 13, the left hollow disk 11, the tubes 12, 12, the right hollow disk 11, the right trunnion 14, the right stuffing-box 16 and a T 28. One part of the steam passes through a bend 29, a suitably bent tube 30 and the serpentine line of heating ribbed tubes 10, 10, while the condensed water passes through a tube 31 to a steam trap 32. The other part of the steam passes from the respective branch of the T 28 through a tube 34, the right forked tube 26, the two heating tubes 25, 25, the left forked tube 26 and a tube 35 to the steam trap 32, from whence the collected water escapes through a tube 33. The T 28 may have an additional branch 73 for discharging the condensed water.

The left trunnion 13 has fastened on it a gear wheel 36, which meshes with a pinion (not shown) on a driving shaft that is mounted to turn in the frame 17, 19 and carries fast and loose pulleys 37, 37. The right trunnion 14 has fastened on it a chain wheel 38 for driving a device for preliminarily drying the husks illustrated at Figs. 3 and 4 and constructed as follows: A conical casing 39 is fastened on the standard 18 and is attached with its flange 40 to the right end wall of the vessel 1 in Fig. 1, this wall being provided with a hole 41. The casing 39 is conically bored, so that a conical sieve 42 can be snugly fitted to its inside. The sieve 42 has parallel annular series of fine slits 43, 43 at right angles to the axis of the casing 39 and the slits 43, 43 are placed in the longitudinal direction. The casing 39 has in its inside parallel grooves 44, 44, which face the slits 43, 43 in the sieve 42, and further a longitudinal channel 45 above and a similar channel 46 below. The lower channel 46 communicates with all of the grooves 44, 44 and also with two tubular connections 47 and 48 at the ends of the casing 39. The upper channel 45 is shown to communicate with most of the grooves 44, 44 and also by means of tubes 49, 50 with a sluice-valve 51. To the casing 39 is attached a hopper 52, the bottom of which forms a continuation of the casing 39 and is provided with a cover 53. In this cover and in a pendent bearing 54 at the flange 40 of the casing 39 a shaft 55 is mounted to turn, which carries a conical worm 56 within and a gear-wheel 57 without. Two parallel horizontal shafts 58 and 59 are mounted to turn in the walls of the hopper 52 and carry agitating arms 60, 60 and 61, 61. The upper shaft 58 is at its left end in Fig. 1 supported by a bearing 65 on the vessel 1 and carries two chain wheels 62 and 63, of which one 62 is connected with the already mentioned chain wheel 38 by means of an endless chain 64. The lower shaft 59 carries on its right end a pinion 74 and a chain wheel 66. The pinion 74 meshes with the gear wheel 57 already mentioned above and the chain wheel 66 is connected with the chain wheel 63 by means of an endless chain 67.

As can be seen from Fig. 3, the casing 39 may have at its left end an annular inward projection 68 of triangular cross section whereby the area is narrowed. Also a slide 69 may be provided in the flange 40 of the casing for further reducing the area, the slide 69 having in the middle of its lower edge a slot (not shown), in which the shaft 55 can engage.

The drying apparatus operates as follows: The hopper 52 is charged with spent malt or husks of grapes, as the case may be, the husks still containing water or liquid. By shifting the driving belt (not shown) from the loose to the fast pulley 37 the apparatus is started, while by opening some stop valve (not shown) steam is supplied to the bend 27, from whence it goes the way described above. The agitating arms 60, 60, 61, 61 prevent the husks in the hopper 52 from clogging together and the slowly rotating worm 56 pushes the husks forward while pressing them against the inside of the conical sieve 42, so that a greater part of the water or liquid is squeezed out of the husks and passes through the fine slits 43, 43 of the sieve and the grooves 44, 44 into the lower channel 46, from whence it escapes through the tubular connections 47, 48 and suitable tubes 70, 71, 72. By regulating the slide 69 the pressure of the turns of the worm 56 and of the sieve on the husks can be so adjusted as to squeeze the maximum quantity of water or liquid out of the husks. The husks leaving the casing 39 through the opening 41 drop on the bottom of the vessel 1 and are here caught by the ladles 21, 21 on the rotary drum E, which take them along the inside of the vessel 1 and throw them over the heating tubes 12, 12. On dropping on the bottom of the vessel 1 the husks are again and repeatedly caught by the ladles, raised and thrown over the tubes 12, 12, while being gradually moved by the slightly oblique ladles from the right to the left end of the vessel 1 in Fig. 1. The husks in contact with the inside of the vessel 1 and with the tubes 12, 12 become heated, so that they are gradually dried up, before they escape through the outlet 22. The wet steam developed from the water or liquid in the husks rises and is dried by the two upper heating tubes 25, 25, so that it is prevented from condensing and wetting the tubes 12, 12. The dried steam then escapes from the vessel 1 through the chimney 24 into the atmosphere. When after the use of the apparatus it is desired to clean the sieve 42 of the water extracting device, the sluice-valve 51 is opened for permitting water from some source to pass through the tubes 50, 49, the upper channel 45, the grooves 44, 44 and the slits 43, 43 of the sieve, whereby the latter is rinsed. The spent water escapes through the tubes 70, 71, 72.

I have found, that when the water extracting device illustrated at Figs. 3 and 4 is omitted and the husks are introduced directly into the vessel 1, the water or liquid contained in the husks commences to boil by the contact with the tubes 12, 12 while the husks gradually dry, so that the tubes are more and more incrusted, whereby their heating power is continually decreased. Also the metallic parts of the apparatus are considerably corroded by the sour water or liquid of the husks, whereby the life of the apparatus is shortened. When, however, most of the water or liquid has been squeezed out of the husks by means of the new device described, the husks can be more easily and quickly dried up, so that the incrustation of the tubes 12, 12 is reduced to a minimum and the life of the apparatus is lengthened. By means of the water extracting device the steam consumption of the drying apparatus is considerably reduced. The drying or superheating tubes 25, 25 also greatly contribute to the preservation of the apparatus, as they prevent the developed steam from condensing and wetting the tubes 12, 12 and the outside of the two hollow disks 11, 11. The escape of the steam from the vessel 1 is also accelerated by its drying.

It is an advantage of the apparatus, that the rotary drum E comprises narrow tubes 12, 12, since they can be made so thin as to increase their heating effect. The numerous ribs between the grooves 44, 44 in the conical casing 39 render it possible to make the sieve 42 from thin galvanized sheet metal and to cut fine slits into this metal.

The husks drying apparatus described can be varied in many respects without departing from the spirit of my invention.

I claim:

1. In a malt or grape husks drying apparatus, the combination with a vessel, of means for simultaneously heating and whirling around the husks in said vessel, heating tubes in the upper part of said vessel, means for passing steam through said heating tubes so as to superheat the steam developed from the husks, and means for discharging the superheated steam from said vessel into the atmosphere.

2. In a malt or grape husks drying apparatus, the combination with a vessel having a semicylindric bottom, of a rotary drum in said vessel comprising two hollow disks at the ends, a plurality of heating tubes between the disks, rods connecting together the disks and oblique ladles on the rods adapted to sweep the inside of the semicylindric bottom of said vessel, means for driving said rotary drum, a hopper for receiving the husks, means for squeezing out of the husks part of their water or liquid and introducing the husks into said vessel at one end, the ladles of said rotary drum being adapted to repeatedly raise the husks and to throw them over the heating tubes while gradually moving the husks from one end to the other end of said vessel, an outlet at the other end of said vessel, heating tubes in said vessel above said rotary drum for superheating the steam developed from the husks, a chimney on said vessel for discharging the steam, a heating device beneath the semicylindric bottom of said vessel, and means for passing steam through said rotary drum, said heating tubes and said heating device.

WILHELM PONNDORF.

Witnesses:
HARRY KOETTKE,
JULIUS SWITKES VEL WITTELS.

Copies of this patent may be obtained for five cents each, by addressing the "Commissioner of Patents, Washington, D. C."